(12) United States Patent
Holmen

(10) Patent No.: US 6,881,145 B2
(45) Date of Patent: Apr. 19, 2005

(54) HARVESTER COMBINE

(75) Inventor: Bengt Holmen, Skara (SE)

(73) Assignee: Rekordverken Sweden AB, Kvänum (SE)

( * ) Notice: Subject to any disclaimer, the term of this patent is extended or adjusted under 35 U.S.C. 154(b) by 42 days.

(21) Appl. No.: 10/399,446

(22) PCT Filed: Oct. 22, 2001

(86) PCT No.: PCT/SE01/02300
§ 371 (c)(1),
(2), (4) Date: Apr. 17, 2003

(87) PCT Pub. No.: WO02/34029
PCT Pub. Date: May 2, 2002

(65) Prior Publication Data
US 2004/0092298 A1 May 13, 2004

(30) Foreign Application Priority Data
Oct. 24, 2000 (SE) .............................................. 0003842

(51) Int. Cl.[7] .............................................. A01F 12/40
(52) U.S. Cl. ...................................... 460/112; 460/901
(58) Field of Search ............................... 460/901, 111, 460/112; 56/500, 503

(56) References Cited

U.S. PATENT DOCUMENTS

| 3,005,637 A | * | 10/1961 | Hetteen ....................... 241/240 |
| 5,215,500 A | * | 6/1993 | Kirby .......................... 460/111 |
| 5,569,081 A | * | 10/1996 | Baumgarten et al. ........ 460/112 |
| 5,797,793 A | * | 8/1998 | Matousek et al. .......... 460/111 |
| 6,406,368 B1 | * | 6/2002 | Cruson et al. .............. 460/111 |
| 6,656,038 B1 | * | 12/2003 | Persson ....................... 460/112 |

FOREIGN PATENT DOCUMENTS

| EP | 0212337 | * | 7/1986 |
| EP | 0357090 | * | 9/1989 |
| EP | 0958727 | | 11/1999 |
| SE | 512815 | | 5/2000 |

* cited by examiner

Primary Examiner—Meredith Petravick
(74) Attorney, Agent, or Firm—Burns, Doane, Swecker & Mathis, LLP

(57) ABSTRACT

A combine harvester has a husk discharge device mounted downstream from a sieving unit, and a blower mounted in a housing having at least one husk discharge opening, and a straw chopping device, which is located downstream from a straw shaking device and the husk discharge device and which has a rotary cutter mounted in a housing to chop the straw, the housing having an inlet for the unchopped straw and an outlet for the chopped straw. A guide means is located upstream of the straw chopping device, the guide means being displaceable between a first position for closing the inlet so as to effect bypassing of the straw chopping device and allowing deposition of the unchopped straw in the form of strings, and a second position in which is exposed the inlet to allow chopping of straw. A spreading device for spreading of the chopped straw received from the straw chopping device is connected to the outlet thereof and is formed with spreader wings. The husk discharge opening is arranged to be directed towards the spreading device, allowing husks to be blown into the device and spreading of the husks over the ground with the aid of the spreader wings.

19 Claims, 6 Drawing Sheets

HARVESTER COMBINE

TECHNICAL FIELD OF INVENTION

Figure 1:
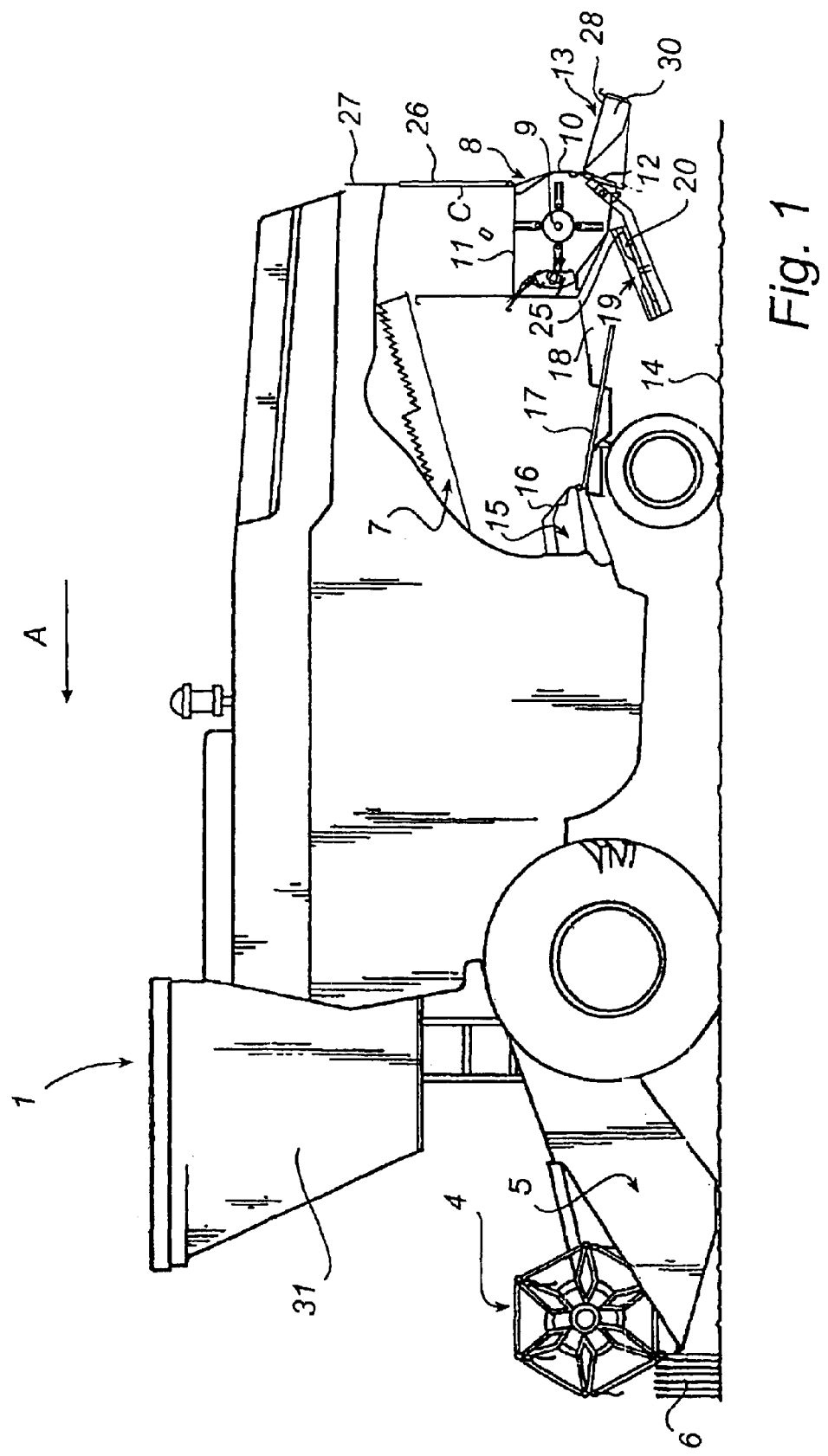

The present invention relates generally to a combine harvester comprising a husk discharge device equipped with at least one blower disposed inside a housing having at least one husk discharge opening, a straw chopping device having an inlet for intake of chopped straw and an outlet for discharge of the chopped straw, and a spreading device having an outlet, which is connected to the straw-chopper outlet and formed with spreader wings.

More precisely, the invention relates to a combine harvester comprising a device for discharge of husks and chaff received from a sieving unit mounted on the combine harvester, said husk discharge device being located downstream from the sieving unit and formed with at least one blower, which is rotationally mounted in a housing having at least one husk discharge opening, a device for chopping straw received from a straw shaking unit or threshing cylinder mounted on the combine harvester, said straw chopping device located downstream from the straw shaking unit or the threshing cylinder and equipped with a rotary cutter disposed in a housing and arranged to chop the straw, said housing having an inlet for reception of unchopped straw and an outlet for discharge of chopped straw, a guide unit located upstream from the straw chopping device and displaceable between a first position, wherein it closes the inlet to the housing of the straw chopping device to effect shunting of the straw chopping device and allowing the deposition of unchopped straw in strings, and a second position, wherein it exposes the inlet to allow straw to be chopped, and a device for spreading over the ground chopped straw arriving from the straw chopping device, said spreading device formed with an upper wall, which is connected to the outlet of the straw chopping device and below which several spreader wings are rotationally mounted for adjustment of the spreading width of the chopped straw across the ground, said spreader wings being arranged side by side and extending in a direction essentially downwards and rearwards from the outlet.

The harvest residues formed in the threshing in the combine harvester usually consist of husks and straw emanating from such crops as wheat, barley, oats and rye but could also originate from for instance different kinds of oil-producing plants and maize, sunflower etcetera, that comprise comparatively large and hard plant parts. However, in the following description, the expressions husks and straw are used throughout for the sake of simplicity and clarity.

BACKGROUND OF THE INVENTION

Modern combine harvesters are becoming bigger and bigger and are formed with increasingly wider cutting tables the width of which considerably exceeds that of the harvester itself. In threshing, large amounts of dust and clouds of particles generate in the area around the harvester, posing a considerable hazard to the engine operation and above all being a serious fire hazard. In order to reduce such hazards it is important that as much as possible of the harvest residues in the form of straw and husks are spread laterally and rearward of the harvester to the largest extent possible.

The husk discharge device that is connected to the harvester sieving unit has a width roughly speaking corresponding to that of the harvester itself, and usually said device should be arranged in such a manner that after the threshing operation it spreads the husk laterally and rearwards over an area essentially corresponding to the width of the cutting table. Also the straw chopping device, which is connected to the harvester straw shaking unit or threshing cylinder and which is located downstream therefrom has approximately the same width as the harvester itself and normally, it is arranged to cut the straw into small pieces after the threshing operation and spread the cut-up straw over an area behind the combine harvester that essentially corresponds to the husk spreading width. Following the spreading of the husk and the cut straw as indicated above, the husk and the straw are as a rule ploughed into the ground together.

If for various reason it is not desired to chop the straw in the straw chopping device but instead to deposit the straw in the form of strings on the ground behind the harvester for subsequent collection and baling at a later date and use as forage, straw-bedding material, etcetera, this could be achieved with the aid of a guide plate. In such cases, the guide plate preferably could be arranged to pivot between a first position, wherein it closes the inlet to the housing of the straw chopping device, thus effecting shunting or bypassing of the straw chopping device and allowing deposition of the unchopped straw in the form of strings, and a second position, wherein it exposes the inlet to allow cutting of the straw in the straw chopping device and spreading of the chopped straw.

From SE-C2-512 815 is known a combine harvester of the type defined above, wherein the straw chopping device is located downstream from not only the straw shaking unit or threshing cylinder but also from the husk discharge device. In this case, the guide plate is located between the husk discharge and straw chopping devices and it is movable between the above-defined positions for deposition of the straw in the form of strings and straw chopping. Irrespective of the position of the guide plate, the husk discharge opening in the blower house of the husk discharge device may be shifted between a first position, wherein the husks is made to spread across the ground, and a second position, wherein the husks may be mixed with the unchopped straw.

When the husk is to be mixed with the straw to be deposited in strings, this operation takes place with the guide plate assuming its first position and the husk discharge opening its second position whereas reversely, when the husks are to be mixed with the straw that is to be chopped, i.e. upstream from this straw chopping device, this operation takes place with the guide plate and the husk discharge opening assuming their respective second positions. In order to make possible admixture of the husk into the straw in the last-mentioned situation, the guide plate is formed with a husk through-passage that is arranged to be closed and opened. The passage is open, when the guide plate assumes its second position, allowing chopping of straw, and it is closed, when the plate assumes its first position, allowing string-deposition of the straw.

For various reasons, such as lack of space or because of different structural/functional solutions, it is very difficult, or even impossible, in some types of combine harvesters, to mount the husk discharge device in a manner allowing the husk without problems to be mixed with or be blown into the straw that is to be chopped in the straw chopping device upstream from said device.

In addition, particularly in the case of large volumes of husks (and boss) it may sometimes involve difficulties to satisfactorily and without unnecessary waste blow the husk out through the open through-passage in the guide plate and into the straw chopping device.

Furthermore, owing to the admixture of husk into the straw that is to be chopped, upstream from the straw chopping device, it may sometimes happen, for instance when large volumes of straw and husk are to be processed or when their moisture contents are high, that the straw chopping device is "overloaded" or becomes clogged. In turn, this situation may lead to impaired spreading of the chopped straw together with the likewise at least to some extent chopped, and even to breakdown.

OBJECT OF THE INVENTION

The principal object of the invention is to provide a combine harvester that does not suffer from the drawbacks and disadvantages outlined above.

Another object of the invention is to allow the operator of the combine harvester to choose/decide for himself whether the harvest residues (husk and straw) are to be spread together or separately, irrespective of whether the straw is to be chopped or be deposited in the form of strings, and to make his choice/decision in consideration of for instance the fire hazards, the type of crop to be harvested, the moisture contents of the crop and the end use of the residues, etcetera.

Yet another object of the invention is to make such freedom of choice possible by technically and functionally simple means.

SUMMARY OF THE INVENTION

These and other objects of the invention are achieved generally in a manner that is as simple as it is ingenious in that the husk discharge opening is arranged to be directed towards the spreading device in order to blow the husk into said device and to spread them over the ground with the aid of the spreader wings.

When the husk discharge opening is directed towards the spreading device the husk arriving from the husk discharge device via the discharge opening therein will be blown straight into the spreading device downstream from the straw shopping device, i.e. in this case after only the straw has been chopped therein and irrespective of whether the straw is to be chopped or laid in strings, and be spread over the ground separately or together with chopped straw with the aid of the spreader wings.

Figure 2:
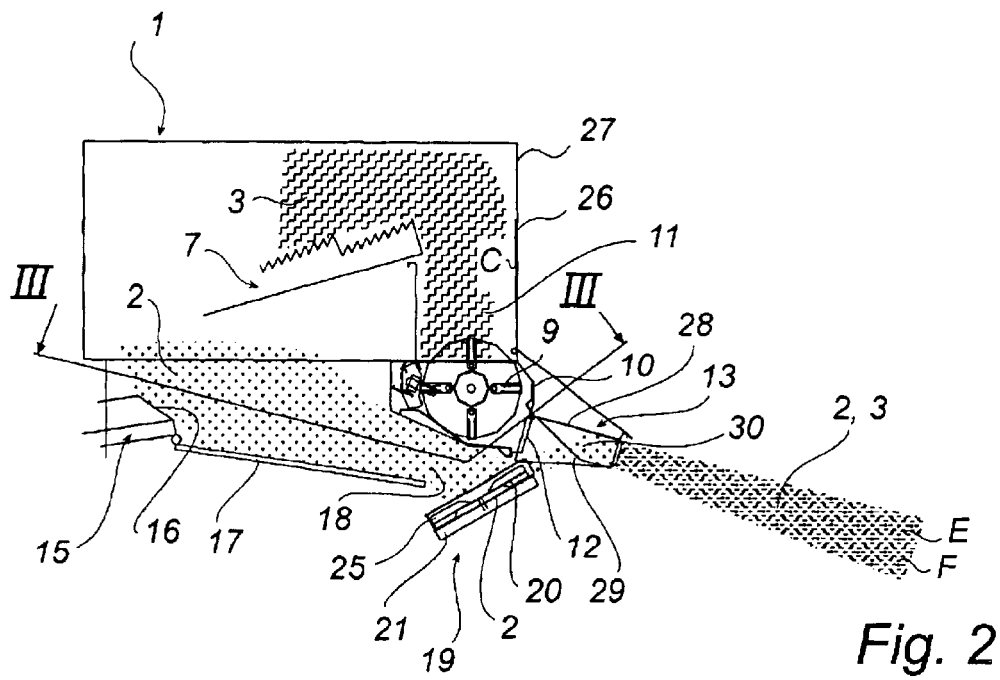
Figure 3:
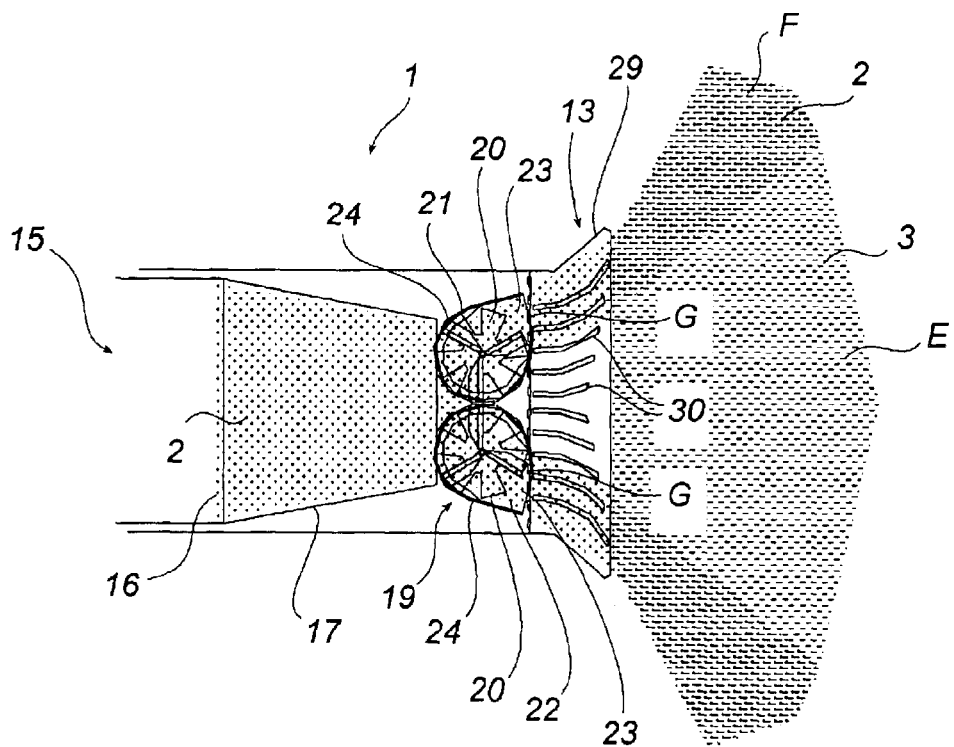
Figure 4:
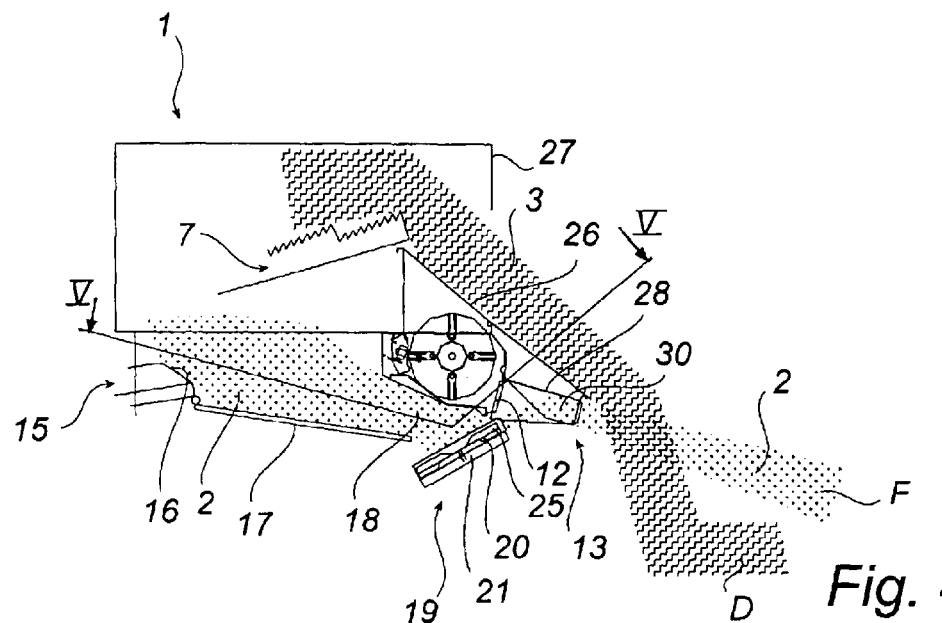
Figure 5:
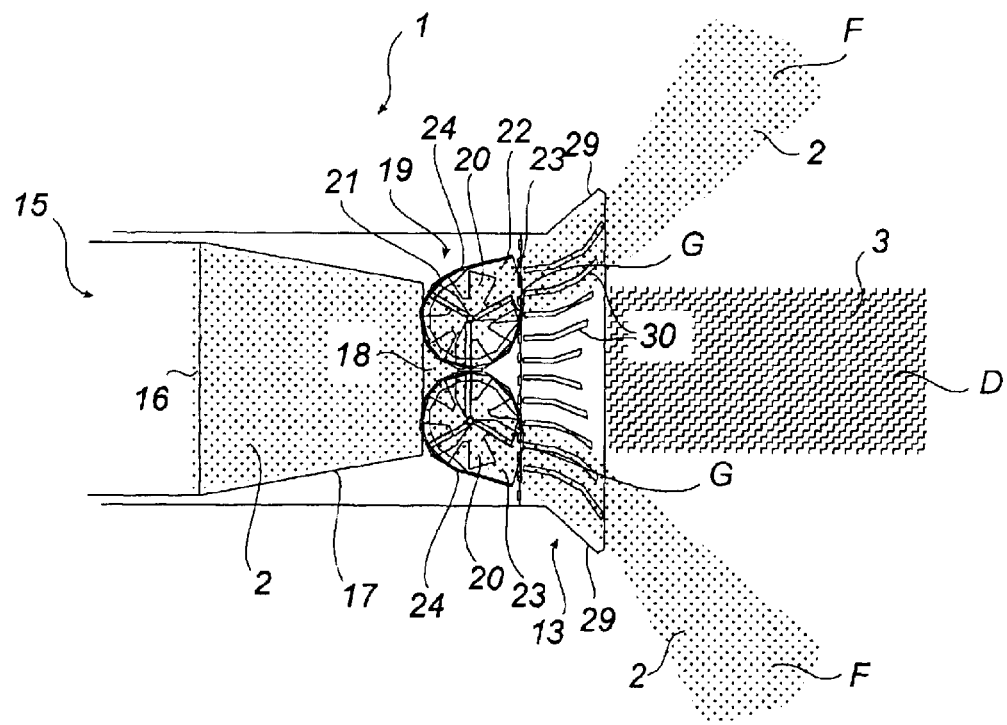
Figure 6:
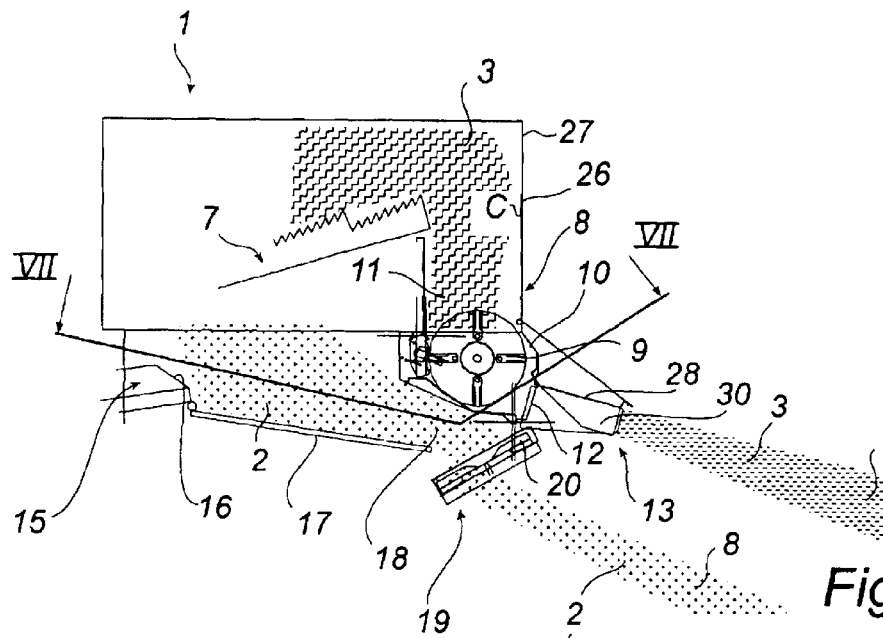
Figure 7:
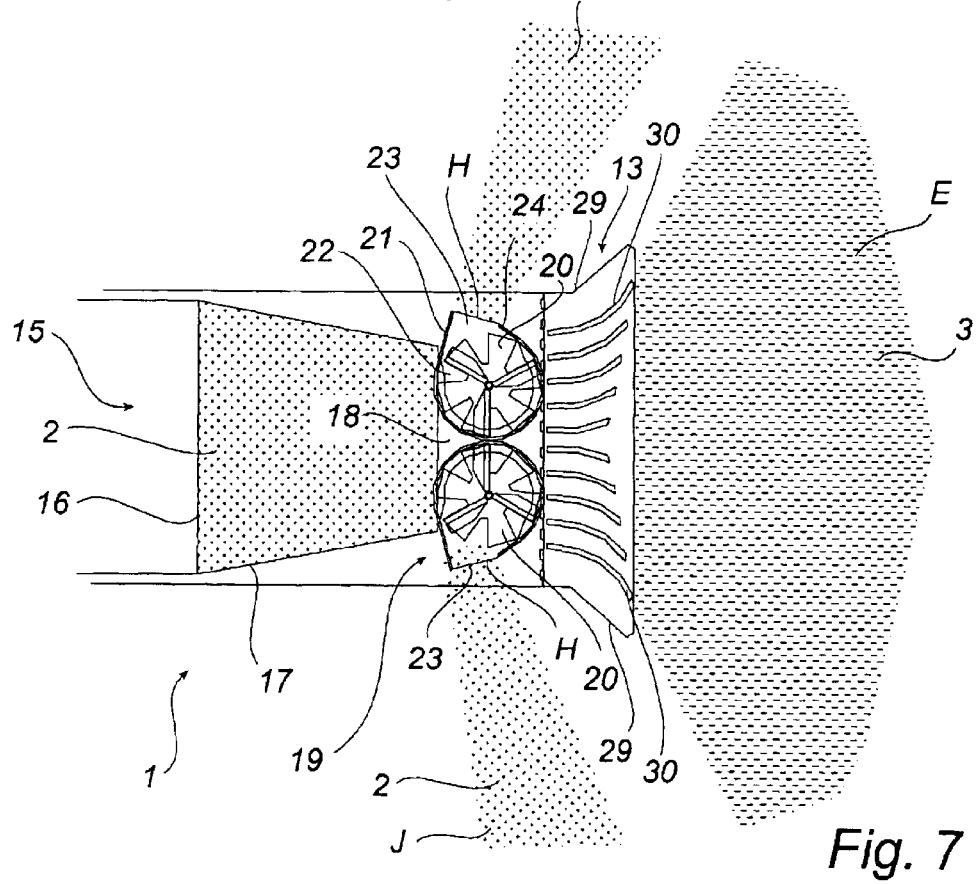
Figure 8:
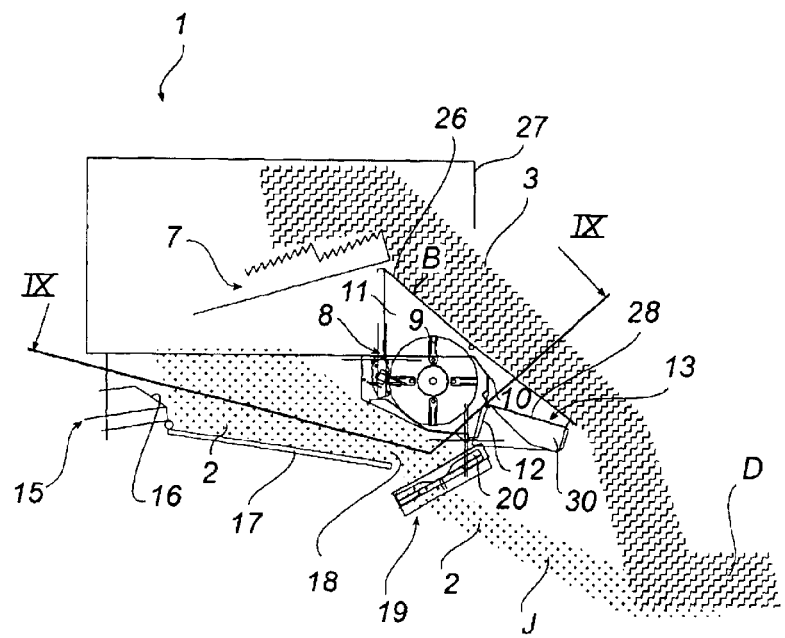
Figure 9:
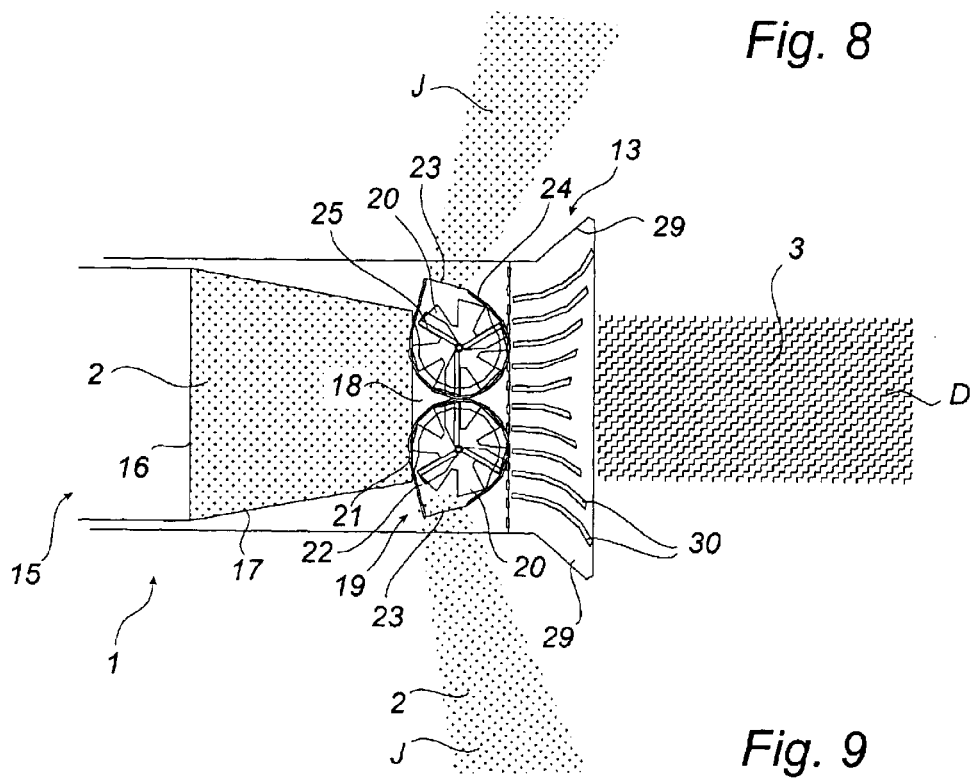
Figure 10:
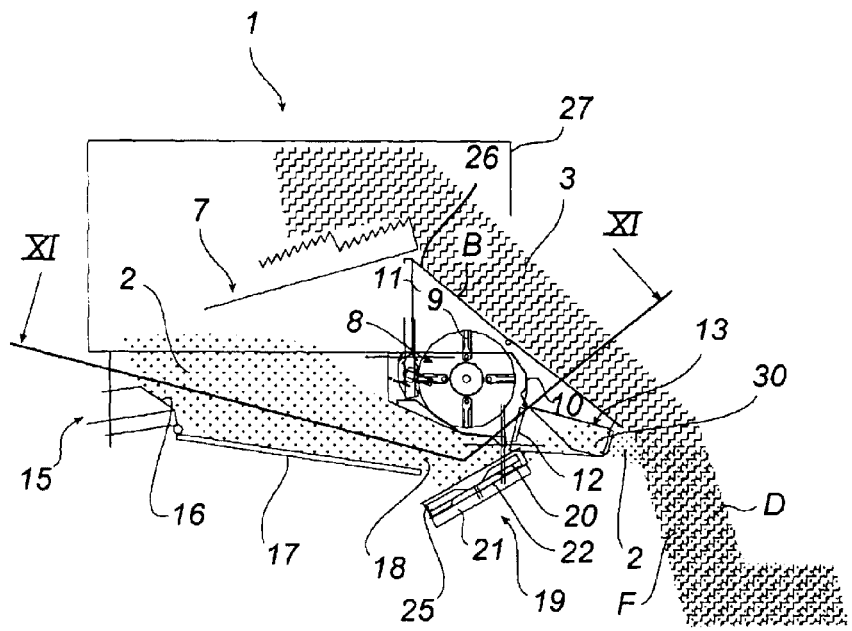
Figure 11:
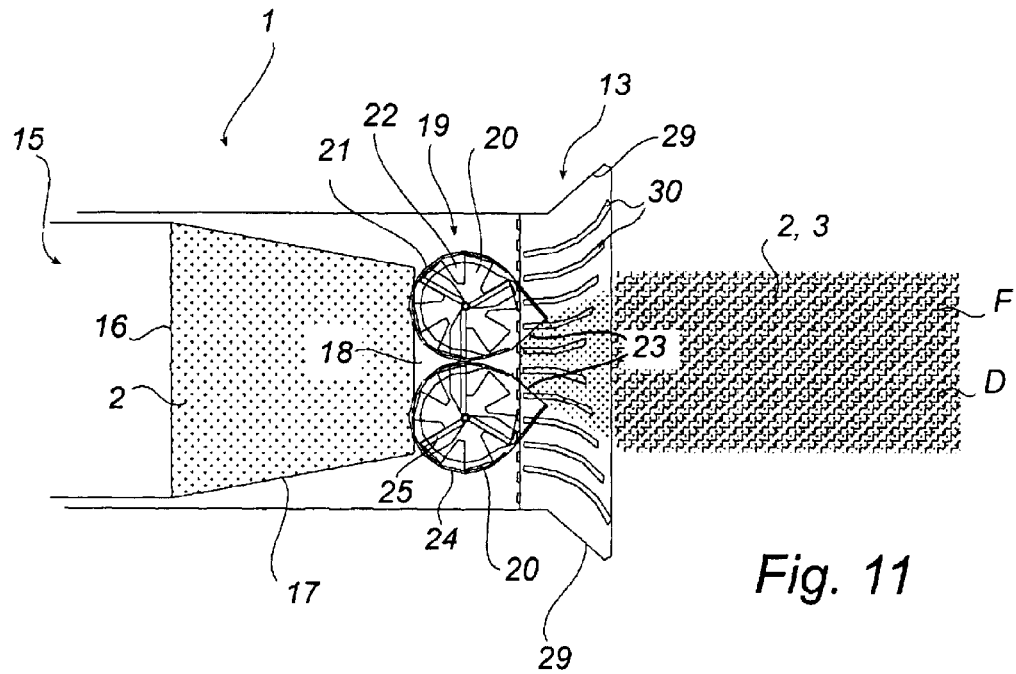

The invention will be described in closer detail in the following with reference to the accompanying drawings, wherein FIG. 1 is a lateral schematical view showing a combine harvester in accordance with a presently preferred embodiment thereof, FIG. 2 is a lateral schematical view showing the rear part of the combine harvester in FIG. 1, to illustrate an operational function involving chopping of straw and spreading of straw and husks jointly, FIG. 3 is a view taken along line III—III of FIG. 2, FIG. 4 is a view corresponding to FIG. 2 to illustrate an operational function involving string-deposition of straw and spreading of husks, FIG. 5 is a view taken along line V—V in FIG. 4, FIG. 6 is a view corresponding to FIG. 2 to illustrated an operational function involving chopping of straw and lateral spreading of husks, FIG. 7 is a view along line VII—VII in FIG. 6, FIG. 8 is a view corresponding to FIG. 2 to illustrate an operational function involving string-deposition of straw and lateral spreading of husks, FIG. 9 is a view taken along line IX—IX in FIG. 8, FIG. 10 is a view corresponding to FIG. 2 to illustrate an operational function involving string-deposition of straw and blowing of husks into the string of straw, and FIG. 11 is a view taken along line IX—IX in FIG. 10.

DETAILED DESCRIPTION OF PREFERRED EMBODIMENTS

The combine harvester designated generally in the drawings by numeral reference 1 is, with the exception of the devices for processing husks 2 and straw 3 to be described in closer detail further on, of essentially conventional design comprising a pick-up reel 4 and a cutting table 5, the width of which considerably exceeds that of the harvester 1. The crop, in the present case straw fodder plants 6 or the like that are to be harvested, is cut off on the cutting table 5 and is transported via conveyors or the like, not shown, to a thresher, not shown either, where the straw 3 and the grains, not shown, are separated from each other.

The straw 3 continues via a straw shaking unit, generally designated by numeral 7, or alternatively via a threshing cylinder or the like, not shown, to a straw chopping device, which is located at the rear end of the harvester 1 as seen in the direction of advancement A and designated generally by numeral 8. This straw chopping device 8 thus is positioned downstream from the straw shaking unit 7 and is designed essentially as a conventional flail chopper including a rotary cutter 9 contained in a housing 10 serving to chop the straw 3. The housing 10 has an inlet 11 facing the straw shaking unit for reception of the threshed but unchopped straw 3 and an outlet 12 for discharge of the chopped straw 3. Downstream from the straw chopping device 8 there is a spreading device, generally designated by reference 13, the purpose of which is to spread the chopped straw 3 and/or, as will be described in more detail in the following, the husks 2 over the ground 14, in this case a field.

The grains discharged from the thresher, not shown, together with the husks 2 (and boss) are conveyed to a sieving unit, generally designated by reference 15 and not either shown in closer detail, wherein the husks 2 are separated from the heavier grains and conveyed in the direction towards the outlet end 16 of the sieving unit 15. In the area of the outlet end 16, there is a guide means, preferably in the form of a guide plate 17, which is pivotally connected to the harvester 1 in the area of the outlet end 16. The guide plate preferably extends essentially horizontally obliquely downwards/rearwards such that in the area below the housing 10 of the straw chopping device 8 it forms, together with said housing, an outlet 18 for discharge of husks 2 arriving from the sieving unit 15.

Adjacent the outlet 18 is located a device, generally designated by numeral 19, for discharge of the husks 2 received from the sieving unit 15. More precisely said husk discharge device 19 preferably is pivotally mounted on the combine harvester 1 in the area below the straw chopping device 8 in a manner allowing it to be set in the position indicated in the drawings and preferably in at least one more position, not shown, wherein it is turned downwards or rearwards, e.g. for the purpose of maintenance and servicing.

In accordance with the embodiments shown and described herein, the husk discharge device 19 comprises two disc-like blowers 20. The blowers are arranged to rotate in mutually opposite directions as indicated by arrows R and are rotationally mounted in a common housing or in individual housings 21, each having one end wall 22 facing away from the sieving unit 15 and one curved peripheral wall 24 in which is formed a husk discharge opening 23. The number of blowers 20 could vary according to wish. In accordance with the embodiments shown herein two such blowers are provided but the discharging device 19 could be equipped with one blower 20 only or with more than two blowers.

The blower/blowers 20 as such do not form part of the present invention and therefore will not be described in close detail. Suffice is to mention that each blower 20 is formed with a number of radially extending blades 25 serving to throw and expel the husks 2 received from the sieving unit 15 via the associated husk discharge opening 23 formed in the blower housing 21 of the husk discharge device 19.

Above or upstream from the straw chopping device 8 a guide means is provided, in this case in the form of a guide plate 26. At its lower end, the guide plate is pivotally mounted on the rear wall 27 of the combine harvester 1. More precisely, the guide plate 26 may be pivoted between a first position B shown in FIGS. 4, 8, and 10, and a second position C, shown in FIGS. 1, 2 and 6. In the first position B, the guide plate 26 closes the inlet 11 to the housing 10 of the straw chopping device 8, thus shunting or bypassing the straw cutter device 8 and allow laying of strings D of unchopped straw 3. In the second position C, on the other hand, the guide plate 26 exposes the same inlet 11 in order to allow chopping of the straw in the straw chopping device 8 and spreading E of chopped straw 3.

The above-defined spreading device 13 serves to spread E the chopped straw 3 received from the straw chopping device 8 and/or to spread F the husks 2 received from the husk discharge device 19 over the ground 14. In accordance with the shown embodiment, the spreading device 13 is essentially designed as a nozzle that is directed rearwards and is open in a downwards/rearwards direction. The nozzle has an upper, essentially horizontal wall 28 and two, essentially vertical end walls 29, the latter in the conventional manner connected to the outlet 12 of the straw chopping device 8. Below the wall 28 and between the end walls 29 several spreader wings 30 are provided. The spreader wings 30 may be stationary or movable, and preferably they are pivotally mounted to allow adjustment/setting of the spreading width over which the chopped straw 3 and/or the husks 2 are spread over the ground 14. Preferably, the spreader wings 30 are arranged side by side and extend essentially rearwards/backwards from the outlet 12.

Returning to the husk discharge opening 23 formed in the blower housing 21 of the husk discharge device 19, said opening is arranged in a manner to be described further on such that it may be directed towards the spreading device 13, more precisely towards the spreader wings 30 thereof, thus allowing husks 2 to be blown into the spreading device and spreading F of husks over the ground 14 with the aid of the spreader wings. In the shown embodiment, the husk discharge opening 23 may thus be directed towards a first position G, wherein husks 2 may be blown by means of the blower 20 into the spreading device 13, as shown in FIGS. 2–5, to spread F husks 2 over the ground 14, and a second position H, wherein husks 2, also by means of the blower 20, is spread J laterally upstream from the spreading device, as shown in FIGS. 6–9.

When the husk discharge device 19 like in the shown embodiments is equipped with two blowers 20, each with its individual husk discharge opening 23, said openings could be arranged to be individually or jointly directed towards their two positions G and H. This freedom of choice/possibility of adjustment obviously exists also if more than two blowers 20 are provided in the husk discharge device 19.

In accordance with the embodiment shown in the drawings, the husk discharge opening 23 or each such opening is directionally adjustable to allow it to be set in positions intermediate their first and second positions G and H, respectively by means of rotation of the blower housing 21 or the associated blower housings 21, respectively, about the centre shaft(s) of the associated blower(s) 20. Such rotation could be achieved in many different suitable ways, preferably manually with the aid of a handle, not shown. Alternatively, the rotation could be effected with the aid of a control means, not shown either, which could be operated electrically, hydraulically, pneumatically or in some other way.

The magnitude of the turning motion of the blower housing/housings 21 depends to some extent on the relative positions of the husk discharge device 19 and the spreading device 13, but in accordance with the shown embodiment, the blower housing/housings 21 are turned over substantially 30–90°, preferably about 60–75°, between the first and second positions G and H.

In accordance with one embodiment of the invention not shown in the drawings, the husk discharge opening 23 may be directed towards its first and second positions G and H in that instead of rotation of the blower housing 21 a first outlet is provided in the area of the first position G and a second outlet in the area of the second position H. In this case, these outlets may be opened and closed according to choice, either alternately or wholly or partly simultaneously, in order to spread husks 2 over the ground 14 either via (F) the spreading device 13 or upstream (J) from the spreading device.

Opening and closing of the outlets are effected by means of a suitable closing element which may be operated manually, electrically, hydraulically or in some other way for movement between the outlet opening and closing positions.

In accordance with one embodiment, the closing element may be designed as shutters, each one of which is associated with its respective outlet, said shutters being hingedly connected in a suitable manner to the husk discharge device 19, preferably to its blower housing 21, in the area of the mouth of the associated outlet.

In accordance with an alternative embodiment the closing element could instead be configured as a damper, which is rotationally mounted inside the blower housing 21 of the husk discharge device 19, essentially concentrically with the axis of rotation of the blower 20, and which is movable/rotational over about 90° between the positions in which it alternately opens and closes the outlets.

For direction of the husk discharge opening 23 towards the spreading device 13 it is advantageous if the position of that opening may be fine-adjusted such that the opening is directed towards selected ones of the spreader wings 30 in order to allow different amounts of air to act on different spreader wings and as a result, the spreading width to be varied. Usually, the husk discharge opening 23 is set in a position wherein it is directed towards the outermost spreader wings 30, as shown in FIGS. 3 and 5, to ensure that husks 2 will be spread obliquely rearwards alone or together with straw 3 without being entrained into the cooling system and the air intake to the engine of the combine harvester 1. In addition, it is essential to increase the speed of the blower air and of the harvest residues (husks and/or straw) at the outermost spreader wings and in this manner increase the spreading width.

A supplementary or alternative way of varying the spreading width is to regulate the speed of rotation of the blower/ blowers 20 of the husk discharge device 19 by means of a prior-art regulating means, which preferably is installed in the driver's cabin 31 of the combine harvester 1 in order to be within easy reach of the driver.

Finally, it may be suitable to make use of the directional adjustability feature of the husk discharge opening 23 in such a manner that upon string-deposition D of the straw 3, see FIGS. 10 and 11, said opening may be set in a position wherein it is directed towards the middle spreader wings 30 in order thus to achieve effective mixing of husks 2 and straw 3.

The invention should not be regarded as restricted to the embodiments as shown in the drawings and described in the aforegoing or to the modifications described but several modifications are possible within the scope of the invention as defined in the appended claims.

What is claimed is:

1. A combine harvester comprising:
   a chaff discharge device equipped with at least one blower disposed inside a housing having at least one chaff discharge opening,
   a straw chopping device having an inlet for intake of unchopped straw and an outlet for discharge of chopped straw, and
   a spreading device, which is connected to the outlet of the straw chopping device and which is formed with spreader wings for spreading the chopped straw over the ground,
   wherein the chaff discharge opening is directable towards a first position, wherein chaff is blown directly into the spreading device, and towards a second position for spreading the chaff laterally upstream from the spreading device.

2. A combine harvester as claimed in claim 1, wherein the spreader wings of the spreading device are located side by side and extend in a direction essentially downwards and rearwards from the outlet of the straw chopping device and wherein the chaff discharge opening, when being directed towards its first position, may be directed towards a desired one of the spreader wings in order to allow different amounts of air to act on different spreader wings and to thus vary spreading width.

3. A combine harvester as claimed in claim 2, wherein the chaff discharge opening is directable towards its first and second positions by means of rotation of the blower housing, said rotation amounting to essentially 30–90° and being effected manually by means of a handle, electrically or in some other way.

4. A combine harvester as claimed in claim 2, wherein the chaff discharge opening is directable towards its first and second positions owing to provision of a first outlet in the first position and a second outlet in the second position, said outlets being arranged to be optionally opened and closed by means of a closing element, which may be shifted manually, electrically, hydraulically or in some other way between outlet opening and closing positions.

5. A combine harvester as claimed in claim 2, wherein rotational speed of the at least one blower of the chaff discharge device may be regulated in order to vary the spreading width.

6. A combine harvester as claimed in claim 2, wherein upon deposition of the straw in strings, the chaff discharge opening may be set in a direction towards middle spreader wings for mixture of the chaff and straw.

7. A combine harvester as claimed in claim 6, wherein the chaff discharge opening is directable towards its first and second positions by means of rotation of the blower housing, said rotation amounting to essentially 30–90° and being effected manually by means of a handle, electrically or in some other way.

8. A combine harvester as claimed in claim 6, wherein the chaff discharge opening is directable towards its first and second positions owing to provision of a first outlet in the first position and a second outlet in the second position, said outlets being arranged to be optionally opened and closed by means of a closing element, which may be shifted manually, electrically, hydraulically or in some other way between outlet opening and closing positions.

9. A combine harvester as claimed in claim 6, wherein rotational speed of the at least one blower of the chaff discharge device may be regulated in order to vary spreading width.

10. A combine harvester as claimed in claim 1, wherein the chaff discharge opening is directable towards its first and second positions by means of rotation of the blower housing, said rotation amounting to essentially 30–90° and being effected manually by means of a handle, electrically or in some other way.

11. A combine harvester as claimed in claim 10, wherein rotational speed of the at least one blower of the chaff discharge device may be regulated in order to vary spreading width.

12. A combine harvester as claimed in claim 1, wherein the chaff discharge opening is directable towards its first and second positions owing to provision of a first outlet in the first position and a second outlet in the second position, said outlets being arranged to be optionally opened and closed by means of a closing element, which may be shifted manually, electrically, hydraulically or in some other way between outlet opening and closing positions.

13. A combine harvester as claimed in claim 12, wherein the closing element is configured as shutters, each one of which is associated with its respective outlet and is hingedly connected to the chaff discharge device.

14. A combine harvester as claimed in claim 13, wherein rotational speed of the at least one blower of the chaff discharge device may be regulated in order to vary spreading width.

15. A combine harvester as claimed in claim 12, wherein the closing element is configured as a damper, which is movably mounted in the housing of the chaff discharge device.

16. A combine harvester as claimed in claim 15, wherein rotational speed of the at least blower of the chaff discharge device may be regulated in order to vary spreading width.

17. A combine harvester as claimed in claim 12, wherein rotational speed of the at least one blower of the chaff discharge device may be regulated in order to vary spreading width.

18. A combine harvester as claimed in claim 1, wherein rotational speed of the at least one blower of the chaff discharge device may be regulated in order to vary spreading width.

19. A combine harvester as claimed in claim 18, wherein the rotational speed of the at least one blower of the chaff discharge device is regulated from a driver's cabin of the harvester in order to vary the spreading width.

* * * * *